United States Patent Office 2,936,911
Patented May 17, 1960

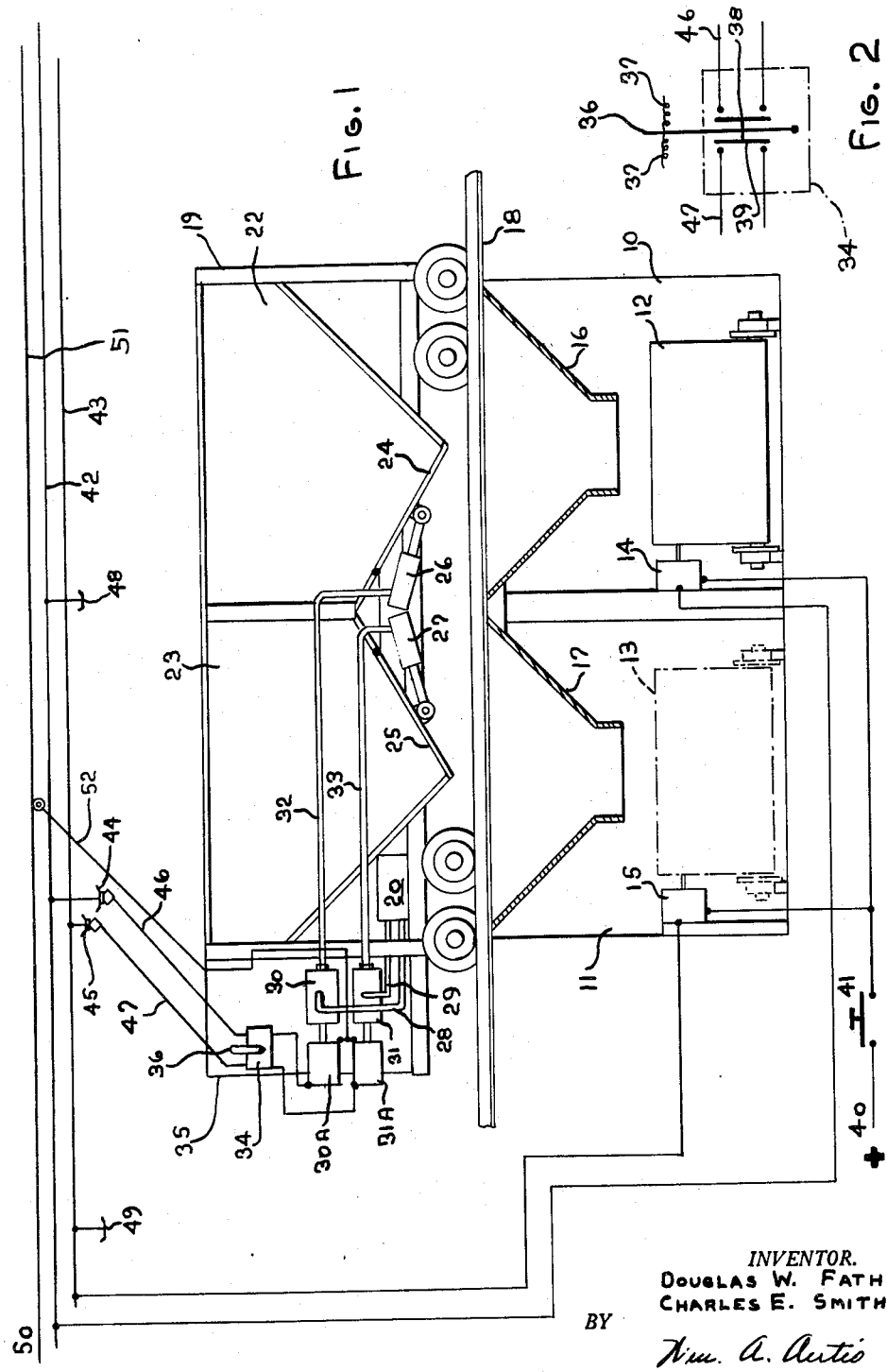

2,936,911

DUPLEX SCALE CAR DUMPING SYSTEM

Douglas W. Fath, Brookfield, and Charles E. Smith, Milwaukee, Wis., assignors to Cutler-Hammer, Inc., Milwaukee, Wis., a corporation of Delaware Application March 10, 1958, Serial No. 720,402

4 Claims. (Cl. 214—38)

This invention relates to control circuits and systems, particularly to those for use in the dumping of duplex scale cars for blast furnaces and other uses.

Scale cars having two or more compartments or hoppers which are to be selectively dumped into skip cars in skip pits are properly located with respect to the pits, the proper hopper automatically determined, and such hopper dumped by manually controlled air cylinders. Heretofore, this manual control was effected by a main control valve in the air pressure line and the selection of the proper hopper required several manually operated air valves and check valves placed between the main control valve and air cylinders. This system was inefficient and subject to frequent malfunctioning. It was cumbersome and space consuming and expensive to install and maintain.

An object of this invention is, therefore, to provide a duplex scale car dumping system which does not have such deficiencies and is relatively easy to install and maintain.

This object is obtained by using a manual spring return control operable in an electrical automatic hopper selective system to energize solenoids controlling the valves to the air cylinders for dumping the hoppers. This eliminates the multiplicity of air control valves used in automatically selecting the proper hopper and results in a simple, effective and sure system.

Another object is to provide a system of this type which is safe and will prevent dumping of a scale car compartment into an empty skip pit.

This is accomplished by a skip car charging control and pit interlocking collector means. Power is supplied only to one distributing circuit at a time. Each such circuit has spaced contact parts, only one of which is engaged by a car shoe or collector and electrically connected to one pair of contacts in a master switch only when a compartment of the scale car is positioned over a pit in which a skip is positioned. If the master switch is accidentally moved in the wrong direction the compartment over the empty skip pit cannot be opened. Movement of the car even with the master switch closed will break the power circuit and close the compartment gate.

In the accompanying drawing:

Fig. 1 is a schematic diagram of a circuit and system embodying the invention as applied to a duplex scale car and dual skip pit and skips; and Fig. 2 is an enlarged schematic view of the master switch.

In the embodiment of the control circuit for the dumping of duplex scale cars shown in the drawing, only those components essential to an understanding of this circuit are depicted and described. This circuit, for example, may be tied in with a load summary program for a blast furnace charging controller and a skip hoist program control. Also there may be incorporated in the circuit well known elements such as safety switches preventing, for example, movement of the scale car when air pressure is low, key operated interlocking or bypassing switches, and manually operated mechanical override levers for emergency operation.

Furthermore, for simplicity and ease of illustrating the invention the circuit is shown as using overhead trolley wires and limit switches contacted by skip cars. However, in actual practice collector rails and shoes and limit switches operated by contact with skip car wheels may be used. Wherever permissible even number references are used to designate all components and elements which are associated with the right skip car, right skip pit, and right scale car compartment, and odd number references are used to designate such components and elements associated with the left skip car, left skip pit and left scale car compartment.

This control circuit is applied to a skip hoist which has a right skip pit 10 and a left skip pit 11. A right skip car 12 descends into the right skip pit 10, as shown, when left skip car 13 ascends to charging position. These cars are operated in unison under a skip hoist program control by mechanisms shown and described in Douglas W. Fath and Charles E. Smith copending application Serial No. 720,400, filed March 10, 1958. When the right skip car 12 is in proper position in skip pit 10 a right skip pit limit switch 14 is closed. When the left skip car 13 is in skip pit 11 (as indicated in broken lines) a left skip pit limit switch 15 is closed. Only one skip car can be in a skip pit. As soon as a skip car leaves its proper position the respective skip pit limit switch is opened with results hereinafter explained. When skip car 12 is in proper position in a skip car pit 10, it will be located beneath a right discharge chute 16. When left skip car 13 is in proper position in left skip pit 11, it will be located beneath a left discharge chute 17. These chutes are located beneath the tracks 18 on which a duplex scale car 19 rides.

The scale car 19 is driven at variable speeds, both forward and rearward, by a motor and controller of customary design (not shown). It has a motor-compressor (not shown) which supplies air under pressure to a compressed air storage tank 20. This tank supplies air for operating air brakes and compartment gates. The control for the scale car movement may be interlocked with the compressed air supply system so that the scale car cannot be operated if the compressed air pressure is low. The scale car has a right compartment 22 and a left compartment 23. Right compartment 22 has a right compartment gate 24 which is swung to and held in closed position by a right air cylinder 26 when supplied with air under pressure. Left compartment 23 has a left compartment gate 25 which is also swung to and held in closed position by a left air cylinder 27 when supplied with air under pressure. Compressed air from the tank 20 is delivered by a pipe 28 to a right air valve 30 operated by a solenoid 30ᵃ. From such valve the air is transmitted by a pipe 32 to the right air cylinder 26. Compressed air is also delivered by a pipe 29 to a left air valve 31 operated by a solenoid 31ᵃ and thence by a pipe 33 to the left air cylinder 27. The solenoid operated air valves are normally open and compressed air in the tank 20 continually holds both gates closed as shown. When a solenoid is energized the air valve closes the connection to the tank 20 and exhausts the air cylinder to atmosphere. This permits the force of gravity to then open the gate.

The solenoids for the air valves are controlled by a master switch 34 mounted on a panel 35 on the scale car. This switch is manually operated by a handle 36 and normally returned to off position by springs 37. When the handle 36 is moved in one direction, for example to the right, a right pair of contacts 38 are closed. When the handle is released such contacts open. When the handle is moved to the left a left pair of contacts 39 are closed. Thus the operator selects the circuit for dumping a desired compartment. This is necessary in certain charging phases when one skip car is loaded partly with a load of coke, ore, stone and/or scrap or when an extra load beyond those scheduled is used.

However, the master switch 34 is effective only when certain other conditions are first met. Solenoid operating power from a D.C. source has a positive side 40 connected to both limit switches 14 and 15 by a control switch 41 which must first be closed. This control switch may be operated by a relay in a skip hoist program so that it closes only when such program calls for a skip load. When switch 41 is closed the positive side 40 is connected to a right overhead trolley wire 42 of a right distributing circuit by the closing of right skip pit limit switch 14 and to left overhead trolley wire 43 of a left distributing circuit by the closing of left skip pit limit switch 15. The right and left distributing circuits are selectively connectible to the right and left pair of contacts 38 and 39 by collector means hereafter described. Hence, one of these limit switches must be closed to make the master switch 34 effective. Another condition is that the scale car 19 must be properly positioned with respect to one or both of the discharge chutes 16 and 17 to connect a distributing circuit to one of the contacts of the master switch. To effectuate this the right trolley wire 42 has a contact bar 44 which is engaged by a right trolley arm 46 and the left trolley wire 43 has a contact bar 45 which is engaged by a left trolley arm 47 only when both compartments 22 and 23 are over the respective chutes 16 and 17, as shown. Right trolley wire 42 also has a contact bar 48 which is engaged by the left trolley arm 47 only when the left compartment 23 is over the right chute 16. Left trolley wire 43 also has a contact bar 49 which is engaged by right trolley arm 46 only when the right compartment 22 is over the left chute 17. Thus, before a distributing circuit may be connected by the master switch to one or the other of the solenoids 30ª and 31ª, a skip car must be in a skip pit and the compartment to be dumped must be over the chute to such skip car.

The negative side 50 of the source of power is connected to a trolley wire 51 on which operates a trolley arm 52 connected with the negative sides of the solenoids 30ª and 31ª.

When it is desired to place a charge from both scale car compartments into one skip car, the skip car is first moved to its pit closing its limit switch. Then the scale car is moved so that one compartment is over the skip car. This connects that skip car distributing circuit to contacts of the master switch for that compartment. The operator then moves the master switch to dump such compartment. The scale car is then moved so that the other compartment is over the skip. This connects such skip car distributing circuit to the other contacts of the master switch. The master switch is then moved in the opposite direction to dump such other compartment.

If the scale car is moved while a gate is open, the engagement between the contact bar and trolley arm will be broken, or if the skip car is moved from the skip pit, the limit switch will be opened and the solenoid will let the air valve move to normally open position and let the compressed air close such gate.

If the operator by mistake moves the master switch to dump a compartment which over a pit in which there is no skip car or which is not over any pit, no gate opening will occur. There will be no circuit established because (a) the limit switch of the empty pit is open or (b) there is no engagement between a contact bar and the trolley arm connected to the contacts of the master switch controlling the solenoid valve for such compartment.

We claim:

1. A scale car dumping and skip car loading system comprising, a skip car pit, a skip car movable into and out of said pit, a source of electrical power, a limit switch connected to one side of said source of power and associated with said pit and closed by said car when in place in said pit, a scale car movable into dumping relation with respect to said pit, means on said car operable to effect a discharge of material in said car, a solenoid on said car effective when energized to control said means and cause a discharge of said material, collector means connecting the other side of said source to said solenoid, a master switch on said scale car connected to said solenoid, collector means between said limit switch and said master switch adapted to make a connection therebetween only when said scale car is in dumping relation with respect to said pit, whereby said master switch can effect dumping only when the scale car is properly over a skip pit in which there is a skip car.

2. A scale car dumping and skip car loading system comprising, several skip car pits, a skip car for each pit movable into and out of its respective pit, a source of electrical power, limit switches connected to one side of said source of power, one of said switches being associated with each pit to be closed by a skip car when in place in a pit, a scale car having two compartments each of which is movable into dumping relation with respect to a selected pit, separate means on said car selectively operable to effect a discharge of material from either compartment, a solenoid on said car for each of said separate means effective when energized to control the selected means and cause a discharge of said material, collector means connecting the other side of said source to each of said solenoids, a master switch on said scale car having an operating handle normally biased to off position, said switch having operating contacts connected to each of said solenoids and separately closed by the operation of said handle, collector means between each of said limit switches and said master switch adapted to make a connection therebetween only when a compartment of said scale car is in dumping relation with respect to a pit in which there is a skip car, whereby said master switch can effect dumping only when the scale car is properly over a skip pit in which there is a skip car.

3. A scale car dumping and system for selectively charging multiple skip cars from a multiple compartment dump car comprising a multiple number of skip car filling stations, a skip car for each station movable into and out of filling position, a dump car having multiple compartments movable to selectively place a compartment in dumping relation to a filling station each compartment having a gate, an air cylinder connected to each gate, a source of air pressure on said dump car for operating said cylinders, an air valve connecting each cylinder to said source of air under pressure, a source of electrical power, a solenoid for each air valve operable when energized to cause said valve and its associated air cylinder to effect an opening of the gate controlled thereby, collector means for continually supplying said electrical power to one side of said solenoids, a master switch on said dump car having separately operable contacts for individually connecting the other side of said solenoids to a selected distributing circuit, a distributing circuit for each skip car filling station, a contact in each such circuit closed by the proper positioning of a skip car in its respective filling station to connect one of said distributing circuits to said source of electrical power, and collector means between said source and said distributing circuits connecting a distributing circuit or circuits with a contact or contacts in said master switch only when said dump car has a compartment or compartments in dumping relation to a skip car filling station or stations in which there is a skip car.

4. In a scale car dumping and skip car loading system, in combination with a pair of skip cars each having a loading position and being alternately movable into their respective loading positions, a scale car having two compartments, said scale car being movable to position a compartment thereof into discharging relation with respect to a selected one of said skip car loading positions or to position the two compartments thereof into discharging relation with respect to the respective skip car loading positions, and discharge means for each said compartment selectively operable to cause discharge of material from either compartment, the improvement comprising means for controlling said discharge means to effect discharge of material from one of said compartments into one of said skip cars only when said one skip car is in its loading position relative to said one compartment, said controlling means comprising a power supply source, an electroresponsive device for each said compartment effective when energized to operate the discharge means of the associated compartment to cause discharge of material therefrom, a plural-position switch operable in response to movement of said scale car to select for energization across said source the electroresponsive device of each said compartment which is positioned in discharging relation with respect to a skip car loading position, said plural-position switch being effective when so operated to prevent energization of the electroresponsive device of each said compartment which is not positioned in discharging relation with respect to a skip car loading position, two limit switches one for each skip car and each such limit switch being operable when the associated skip car is moved into its loading position, each said limit switch being effective when so operated to partially complete an energizing circuit across said source for an afore selected electroresponsive device of the compartment which is positioned in discharging relation with respect to the skip car associated with the operated limit switch, and a manual switch operable at will to complete the last mentioned energizing circuit thereby to effect discharge of material from a compartment of the scale car into the skip car which is in its loading position.

References Cited in the file of this patent

UNITED STATES PATENTS

| | | |
|---|---|---|
| 1,755,077 | Schellentrager | Apr. 15, 1930 |
| 2,271,726 | Vogel | Feb. 3, 1942 |
| 2,288,763 | Winship et al. | July 7, 1942 |
| 2,317,175 | Burdick | Apr. 20, 1943 |
| 2,727,669 | Sackett | Dec. 20, 1950 |
| 2,767,659 | Greenblatt | Oct. 23, 1956 |